M. C. A. LATOUR.
ALTERNATING CURRENT SHUNT MOTOR.
APPLICATION FILED AUG. 17, 1907.

918,561.

Patented Apr. 20, 1909.

Witnesses:
George H. Tilden
J. Ellis Glen

Inventor:
Marius C. A. Latour,
by Albert H. Davis
Att'y.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

ALTERNATING-CURRENT SHUNT-MOTOR.

No. 918,561.  Specification of Letters Patent.  Patented April 20, 1909.

Application filed August 17, 1907. Serial No. 388,992.

*To all whom it may concern:*

Be it known that I, MARIUS C. A. LATOUR, a citizen of France, residing at Paris, France, have invented certain new and useful Improvements in Alternating-Current Shunt-Motors, of which the following is a specification.

My invention relates to alternating-current motors of the commutator type having shunt characteristics.

It is well understood in the art that if the field or exciting winding of an alternating-current motor be supplied with a shunt voltage dephased by ninety degrees from the voltage supplied to the armature, the motor will operate with characteristics somewhat similar to those of a shunt motor. The constant-speed characteristic of a direct-current shunt motor is only approached by the arrangement described above, because the self-induction of the armature circuit results in an increasing voltage-drop in the armature winding with increasing load, so that the speed falls off as the load increases. The addition of a simple series excitation increases the droop in the speed characteristic. By my invention, however, a true shunt or constant-speed characteristic is obtained. I obtain this result by superposing on the shunt excitation a series excitation dephased from the armature current. Because of this phase displacement this series excitation acts very differently from a simple series excitation. A series excitation in phase with the armature-current produces a counter-electromotive force in the motor substantially in opposition to the impressed voltage, so that as the series excitation is increased by increase of load, the speed of the motor tends to fall. By dephasing the series excitation, the electromotive force induced in the armature by the series excitation may be dephased ninety degrees from the impressed voltage, so that the induced voltage does not act as a counter-electromotive force, but simply neutralizes the self-induction of the armature. Since both the inductive drop in the armature and the series component of the excitation increase with the increase in current, this series component may be adjusted to neutralize the armature self-induction for all loads, so that the motor operates with the constant speed characteristic of a true shunt motor.

My invention will best be understood by reference to the accompanying drawing, in which—

Figure 1:
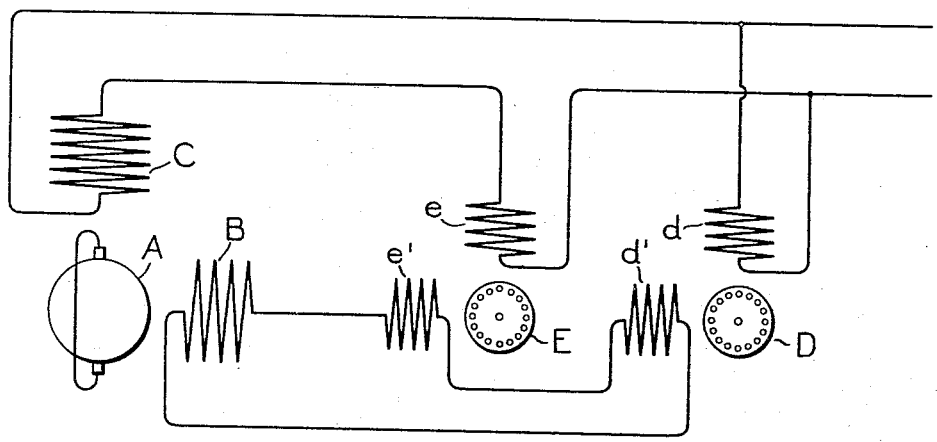
Figure 2:
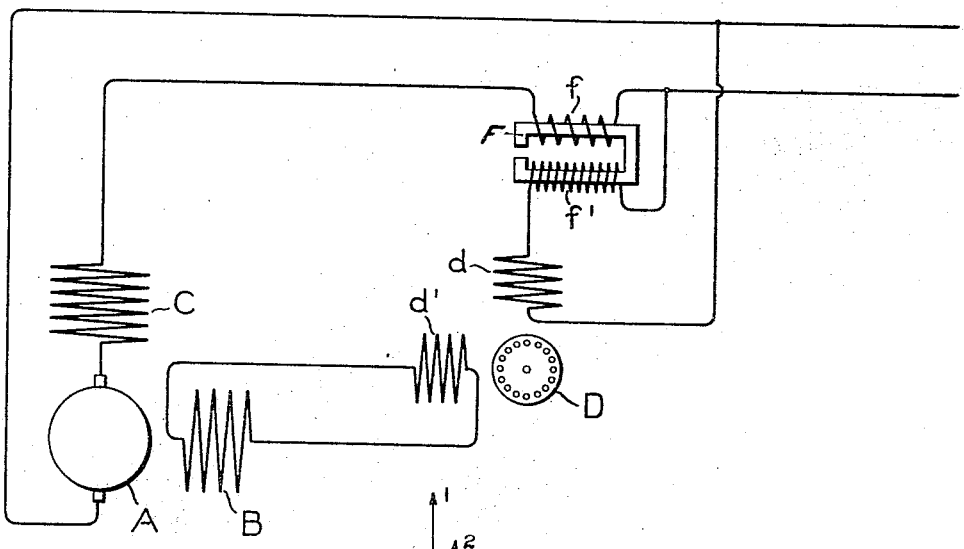

Figure 1 shows diagrammatically an alternating-current shunt motor arranged in accordance with my invention; Fig. 2 shows a modification of the same; and Fig. 3 is an explanatory diagram.

In Fig. 1, A represents the armature of an alternating-current motor of the commutating type. I have shown the armature short-circuited, as in a repulsion motor. B represents the field or exciting winding, and C the inducing winding, which induces the current in the short-circuited armature. In order that the motor shall have a shunt characteristic, it is necessary to supply the field winding B with a shunt voltage dephased approximately ninety degrees from the voltage impressed on the inducing winding C. For deriving this dephased voltage from the source, I have shown a phase converter D, which is shown diagrammatically as of the well known single-phase motor type having a short-circuited rotor and one stator winding $d$ connected in parallel with the inducing winding C, and the other stator winding $d'$ connected to the field winding B. If the windings $d$ and $d'$ are displaced from each other by ninety electrical degrees, the winding $d'$ supplies to the winding B a voltage dephased 90 degrees from the voltage of the source which is impressed on the inducing winding C. To provide the series component of the excitation I employ a second phase converter E, having one stator winding $e$ connected in series with the inducing winding C, and the other winding $e'$ connected in series with the field winding B. This second phase converter E, consequently, supplies to the field winding a component current proportional to the armature current, but dephased approximately ninety degrees therefrom. This component of the field current produces in the armature an electromotive force dephased ninety degrees from the armature current, and consequently in opposition to and counter-balancing the electromotive force of self-induction of the armature. By means of this dephased series excitation, the self-induction of the armature and inducing windings may be neutralized so that the inductive drop usual in such motors is eliminated, and a constant-speed characteristic obtained.

Figure 3:
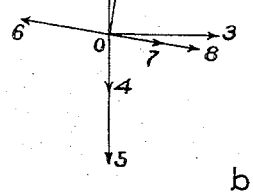

The phase relations above specified are shown in the diagram in Fig. 3. In this diagram $O^1$ represents the phase of the voltage impressed on the inducing winding C, and may also represent the phase of the voltage induced in the armature. $O^2$ represents the phase of the armature current. $O^3$ represents the component of the voltage impressed on the exciting winding B from the shunt phase converter D. $O^4$ represents the component of the exciting flux due to the voltage $O^3$. $O^5$ represents the voltage induced in the armature by cutting the flux $O^4$. $O^6$ represents the phase of the electromotive force of self-induction of the armature approximately ninety degrees out of phase with the armature current $O^2$. $O^7$ represents the component excitation due to the series phase converter E, this being displaced approximately ninety degrees from the armature current $O^2$. $O^8$ represents the electromotive force induced in the armature by cutting the flux $O^7$, this latter electromotive force being in opposition to the electromotive force of self-induction $O^6$. It will be noted that both the shunt excitation $O^3$, which produces a magnetization ninety degrees out of phase with it, and the series excitation $O^7$, which produces a magnetization in phase with itself, are both out of phase with the armature current $O^2$.

In Fig. 2 I have shown my invention applied to a series motor, the armature winding A being connected in series with the winding C, which then becomes the compensating winding of the motor. It will be understood that the arrangement of phase converters shown in Fig. 1 is applicable to a series motor, as well as to a repulsion motor, and that the modified arrangement of Fig. 2 is equally applicable to a repulsion motor. In this modified arrangement, the phase converter employed for the series component for the excitation in Fig. 1 is omitted, and for it is substituted an ordinary series transformer F having its primary winding $f$ in series with the motor armature, and its secondary winding $f'$ in series with the winding $d$ of the phase converter D. The transformer F is designed with an open magnetic circuit so as to give a considerable amount of leakage, since, otherwise, the current in the secondary winding $f^1$ and consequently in the phase converter winding $d$ would always be exactly proportional to the armature current of the motor, instead of merely having a component proportional to the armature-current.

From what has already been said, the purpose and operation of the arrangement of Fig. 2 will be understood. The series transformer F supplies to the winding $d$ of the phase converter a current component proportional to the armature current of the motor, and this component current in the winding $d$ appears as a dephased series excitation in the winding $d^1$, and is supplied from that winding to the field winding B of the motor. Other arrangements for securing the dephased series excitation will be obvious to those skilled in the art. Accordingly, I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with an alternating-current motor of the commutator type, connections including means for impressing on the exciting winding of the motor a constant voltage dephased from the voltage impressed on the motor armature, and means for superposing on the constant excitation a series excitation proportional to the armature current but dephased therefrom.

2. In combination with an alternating-current motor of the commutator type, means for supplying to the exciting winding of the motor shunt and series excitations, both dephased from the armature current of the motor.

3. In combination with an alternating-current motor of the commutator type, a single-phase source of current therefor, and means for deriving from said source and supplying to the exciting winding of the motor shunt and series excitations both dephased from the armature current of the motor.

4. In combination with an alternating-current motor of the commutator type, connections including means for impressing on the exciting winding of the motor a constant voltage dephased from the voltage impressed on the motor armature, and means for deriving from the armature circuit and supplying to the field a component of the field current proportional to but dephased from the armature current.

In witness whereof, I have hereunto set my hand this 12th day of August, 1907.

MARIUS C. A. LATOUR.

Witnesses:
BENJAMIN B. HULL,
HELEN ORFORD.